United States Patent [19]
Jensen

[11] 3,963,038
[45] June 15, 1976

[54] LIQUID PROPORTIONING PUMP

[76] Inventor: Raymond W. Jensen, 28081 Ella Rd., Palos Verdes Peninsula, Calif. 90274

[22] Filed: Aug. 15, 1974

[21] Appl. No.: 497,818

[52] U.S. Cl. .................................. 137/99; 91/50; 417/397
[51] Int. Cl.² .................................. G05D 11/03
[58] Field of Search ............ 137/99; 91/50; 417/397

[56] References Cited
UNITED STATES PATENTS

| | | | |
|---|---|---|---|
| 2,081,239 | 5/1937 | Klopfenstein | 91/50 |
| 2,803,260 | 8/1957 | Wells | 137/99 |
| 2,917,025 | 12/1959 | Dulaney | 91/50 |
| 2,951,745 | 9/1960 | Sweet et al. | 417/397 X |

*Primary Examiner*—Robert G. Nilson
*Attorney, Agent, or Firm*—I. Morley Drucker

[57] ABSTRACT

The invention is directed to a hydraulically actuated feed and proportioning pump with a centrally located movable diaphragm which divides a main pump housing into two variable volume main fluid chambers. Each main fluid chamber has its own integral inlet and outlet valve means which enables the chambers to cyclically discharge fluid mixture which is part additive and part water obtained from a main feed line. The movable diaphragm is alternately exposed to a fluid source under pressure on one side and to a relative vacuum, created by the evacuation of fluid, on the other side.

A piston is connected to the movable diaphragm and moves slidably within a piston housing forming thereby two piston chambers. The movement of the piston within its housing creates a vacuum in one of the piston chambers, and the additive (e.g., fertilizer) is drawn into the piston chamber and later sent, on a piston delivery stroke, into the fluid chamber and mixed within the main fluid chamber, in a given volume proportion with the water from the main feed line.

12 Claims, 5 Drawing Figures

U.S. Patent June 15, 1976 3,963,038
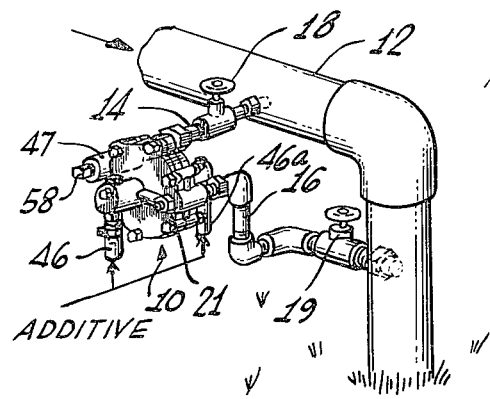
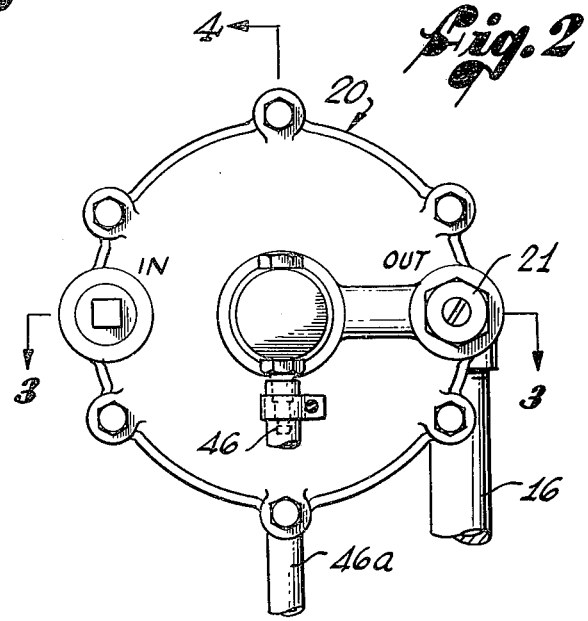
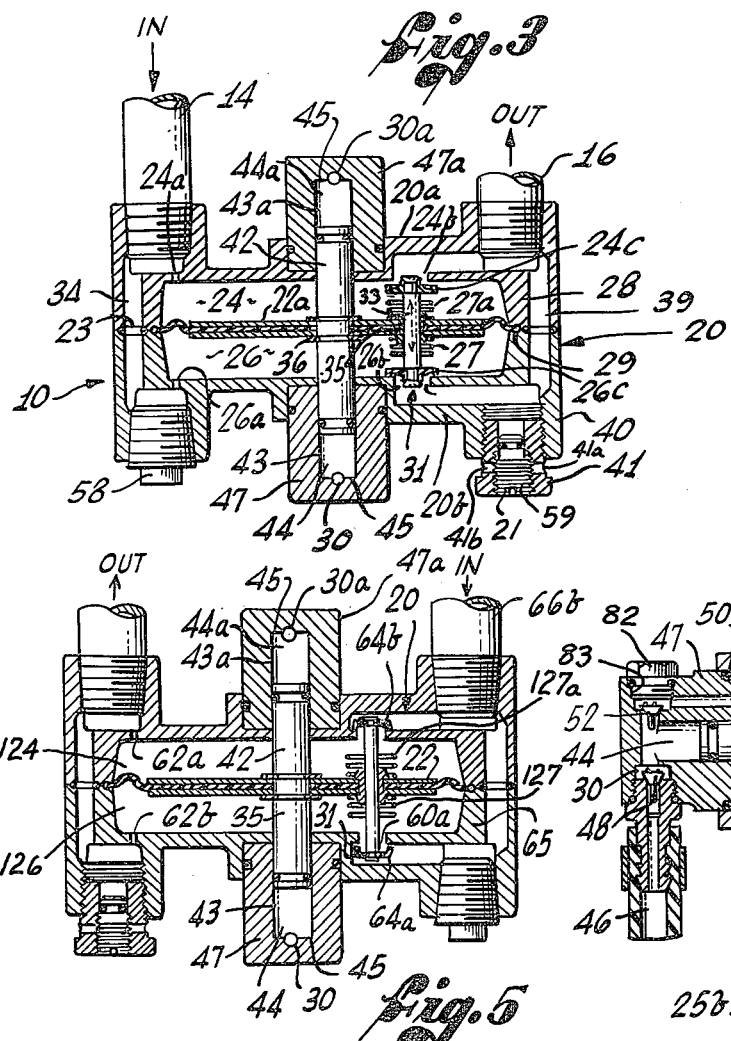
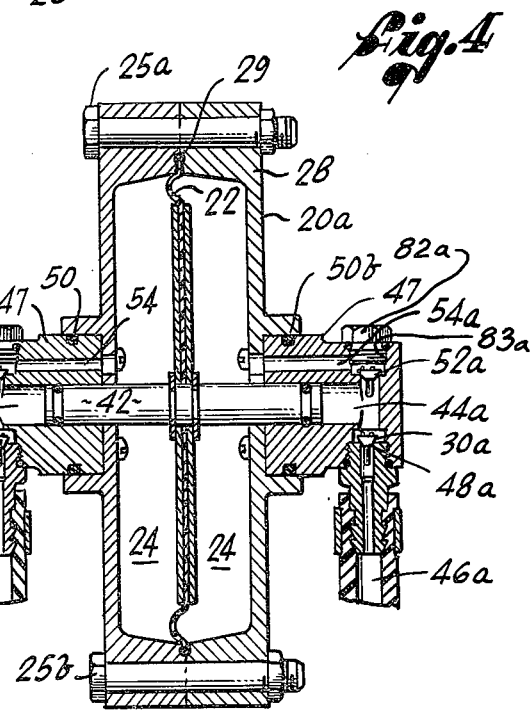
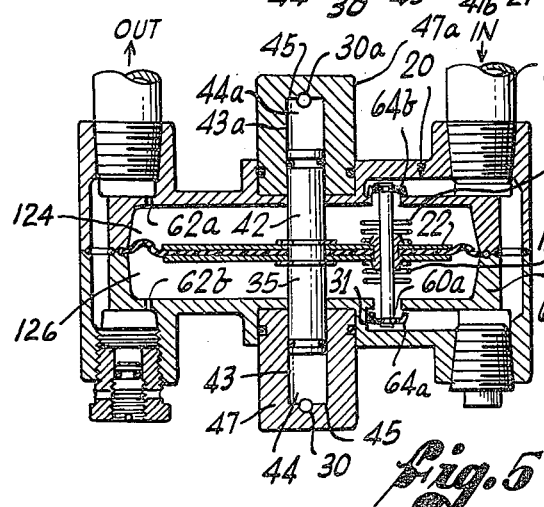

LIQUID PROPORTIONING PUMP

BACKGROUND OF THE INVENTION

Feed and proportioning pumps which use a hydraulically powered fluid chamber to control and proportion the injection of chemicals or additives into a second flow stream are well known. The present unique design of such a proportioning pump finds particular utility in connection with water lines leading to commercial sprinkler systems.

DESCRIPTION OF THE PRIOR ART

Heretofore, designs of proportioning pumps have resulted in very large pressure drops across the pumps (10 – 20 p.s.i.) thus reducing the pressure at the outlet of the pump. An example of this type of pump is described in the following U.S. Pat. No. 2,951,745 entitled "LIQUID PROPORTIONING PUMP SYSTEM" which was issued to S. W. Sweet et al. The Sweet patent, which is typical of what is on the market today, discloses a diaphragm-piston chamber arrangement in which an external complex valving system is required, leading to large pressure drops. Further, the mixing of the two liquids takes place in a chamber separate from the diaphragm chamber adding to the complexity of the structure.

The Sweet pump results in relatively large pressure drops in the system valving. The large pressure drops required by the Sweet pump result in a greater likelihood of water surge or water hammer which, in turn, causes excess fatigue in the parts of the pump, including the diaphragm. In addition, the required large pressure drop causes a serious problem in re-starting a pump that has already stalled.

The Sweet type external valving system, consisting of a toggle/overcenter-spring switching arrangement results in a null point in the flow which momentarily causes a hydraulic surge through the momentarily closed system. The surging problem created by both the large pressure drop and the switching arrangement causes pumps of this type to last a relatively short time.

The present invention mixes the additive and the water in the same chamber from which the liquids are pumped by the movable diaphragm; the necessity for an external mixing chamber and a complicated inlet-outlet valving system is removed. Thus, the proposed system, because of its simplicity, can operate on very low pressure differentials in the line (on the order of one-half p.s.i.), thereby virtually eliminating the water hammer problem. In addition, since some water or fluid mixture is at all times within both chambers bounded by the diaphragm, and because the diaphragm is "pumping" in both directions in the housing, there is no null point in the pump's operation and thus no accompanying hydraulic surge. It is anticipated that the proposed pump will perform satisfactorily, during normal operation, for a period of three years or more.

SUMMARY OF THE INVENTION

This invention relates to a novel construction of a proportioning feed pump for automatically injecting fertilizer (or other additive), in solution, into another main fluid stream (e.g., a main water line). The pump is designed and constructed to inject the additive solution in direct volume proportion to the volume of flow of water in the main line.

The pump comprises a, preferably metal, main housing and a movable diaphragm centrally mounted within the housing; two main fluid chambers are thereby formed, one located on each side of said diaphragm, said fluid chambers being variable in volume because of the movement of said diaphragm; inlet and outlet ports are provided to and from the fluid chambers, respectively; spring-loaded valve means are provided, preferably for the alternative opening and closing of the outlet ports; and a piston is provided, mounted within a piston housing to create thereby first and second piston chambers, the piston chambers communicating with an additive line. The piston is mounted to the diaphragm.

In operation, a portion of the flow from the main line is diverted through the main inlet pipe to the two main fluid chambers.

At the very outset of the pumping action, the diaphragm is initially caused to move, in one direction or another, under the influence of slightly greater water pressure on one side of the diaphragm than the other. It has been found, surprisingly, that while the main fluid chambers and diaphragms are produced on as precise a basis as possible, the slightest irregularities in production cause a slight volume difference of one main chamber with respect to the other, in turn, leading to an initial slight pressure differential between chambers which, in turn, causes the diaphragm to initially move to one side or the other of the main housing. The valve means, mounted on the diaphragm, thereupon initially moves to close off one of the outlet ports and to open the other outlet port - and the cyclical pumping action commences.

Specifically, the piston, mounted to the diaphragm, will, of course, move with the diaphragm, creating a suction stroke in one piston chamber and a delivery stroke in the other piston chamber. Thus, additive is drawn into one piston chamber and is delivered from the other piston chamber into the main pumping chamber. The additive delivered into the main chamber is ejected therefrom, through the main outlet port, with the main fluid stream. And as ejection of these fluids is completed, the valve of that main chamber is closed and the valve of the other main chamber is simultaneously opened. The diaphragm moves in a reverse direction, under the reverse pressure differential created, thereby causing ejection of the main fluid stream and causing the piston in the piston chamber to eject the additive, previously stored therewithin, into the main fluid stream.

The additive and water are necessarily mixed within the main fluid chambers, during the pumping motion of the diaphragm, and the resulting solution is discharged into the outlet line. For a given piston size, the volume of additive drawn into the main chambers depends upon the volume of flow of water into the inlet port which, in turn, is a function of the volume of flow through the main line.

The pump is self-energized from the main water line pressure by respectively opening, in series, a priming valve, and an inlet and outlet shut-off valve. It is not necessary to have a suction build-up to overcome any spring-loaded valving action and the initiation of the pumping action begins immediately upon a slight pressure differential prevailing in one of the chambers.

Because of the very low pressure drop across the pump, it is not necessary to place any restriction in the main line in order to constrain the flow so as to create the required pressure drop to balance the system pressures. In addition, it is not required that the valving be sealed, fluid tightly, since the continuous nature of the fluid flow in the chambers results in a self-cleaning of the pump.

The overriding object of the invention is to provide a novel diaphragm-actuated proportioning pump in the form of a low cost pump which can operate on very low pressure drops in the line and, wherein, water hammer (surge) is eliminated.

BRIEF DESCRIPTION OF THE DRAWINGS

FIG. 1 is a perspective view of the proportioning pump as installed in a typical sprinkler installation;

FIG. 2 is a front elevational view of the proportioning pump showing the main fluid inlet and outlet lines and the two additive inlet housings;

FIG. 3 in an axial, transverse, cross-sectional view, taken along the line 3—3 of FIG. 2, showing the plan view of the interior of the main pump housing with the preferred embodiment of the main fluid inlet and outlet means;

FIG. 4 is a cross-sectional view, taken along line 4—4 of FIG. 2, which shows a side elevation of the proportioning pump illustrating, in particular, the structure of the additive inlet and outlet housing; and FIG. 5 is a cross-sectional view of the alternative embodiment of my invention taken along the transverse axis thereof.

DETAILED DESCRIPTION OF THE PREFERRED EMBODIMENT

Referring to FIGS. 1 to 4 in general, and to FIG. 1 in particular, the system shown includes the hydraulically operated feed and proportioning pump 10 of my invention as typically installed in a main feed line 12. Leading to pump 10 is a fluid inlet pipe 14, and leading from pump 10 is the fluid outlet pipe 16. The fluid inlet shut-off valve 18 and the fluid outlet shut-off valve 19 are installed in inlet and outlet pipes 14 and 16, respectively. The pump 10 has a self-contained priming valve 21.

FIG. 2 shows a front elevational view of the main pump housing 20, which is preferably made of cast metal, and to which is connected the priming valve 21, the main fluid inlet pipe 14, the main fluid outlet pipe 16, and, preferably, two additive inlet pipes 46, 46a, which are vertically aligned in this view.

Referring now to FIGS. 2-4, in particular, the pump 10 comprises a generally circular main housing 20, which is composed of two substantially identical sub housings 20a, 20b. The sub-housings 20a, 20b are fastened, in a fluid-tight manner, by a series of bolts 25a, 25b. Centrally mounted within the main housing 20 is a diaphragm 22, preferably made of flexible, rubber material. A pair of main fluid chambers 24, and 26, are formed on each side of diaphragm 22. The diaphragm 22 has a diameter larger than that of the interior of housing 20, and is movable within the housing, in a bellows fashion, as pressure differentials are created on one side or the other of the diaphragm.

Fluid inlet orifices 24a, 26a and fluid outlet orifices 24b, 26b, lead into and from, the main housing 20, respectively. Spring-loaded valve sealing means 31 are provided for alternately opening and closing fluid outlet orifices 24b, 26b. The fluid inlet pipe 14 communicates with fluid inlet orifice 26a by means of a bypass inlet line or bore 23. The fluid outlet pipe 16 communicates with fluid outlet orifice 26b through a bypass outlet bore 39. Both lines or bores 23 and 39 are formed within the pump housing 20.

Mounted to each side of the generally circular flexible diaphragm 22 are diaphragm plates 22a, 22b. The plates 22a, 22b are preferably made of metal, and form the movable boundary of each of the main fluid chambers 24, 26, respectively. The plates 22a, 22b are mounted to the diaphragm 22 in any suitable manner and together, with the diaphragm 22, form the diaphragm assembly 34. The diaphragm 22 has a peripheral bead 29 integrally formed therearound. The head 29 secures the diaphragm assembly 34, in a fluid tight joint, to a peripheral mating recess 28 formed in pump sub-housings 20a, 20b.

The diaphragm assembly 34 is affixed, by snap rings 36, to a cylindrical piston 42. The piston 42 moves slidably within bores 43, 43a of piston housings 47, 47a, respectively. The ends walls of bores 43, 43a (designated by the numerals 45, 45a, respectively) and the ends of piston 42 form piston chambers 44, 44a, respectively.

The valve sealing assembly 31 includes a valve stem 33 mounted to the diaphragm assembly 34 by means of a bushing 35. Relief valves 24c, 26c are mounted onto the ends of the valve stem 33. When one of the relief valves closes off one of the outlet orifices 24b or 26c, the other outlet orifice remains open with the other relief valve unseated. A pair of coil springs 27, 27a are mounted onto the valve stem 33. The seating and unseating of the relief valves 24c, 26c are aided by the flexion of the springs 27, 27a. The ends of the springs 27, 27a, adjacent the diaphragm assembly 34, are preferably affixed to the diaphragm plates 22b, 22a. Action of the springs 27, 27a prevents the diaphragm from reaching a null point in the flow, thereby eliminating the potential for both a dead spot in the pumping action and a momentary hydraulic surge.

Additive inlet and outlet means are each contained in piston housings 47, 47a. The piston housings 47, 47a are removably mounted by headed bolts 80, to sub housings 20b, 20a, respectively. The additive inlet means comprises inlet spigots 49, 49a threadably affixed, in a fluid tight manner, to suitable openings in piston housings 47, 47a, respectively. Inlet check valves 30, 30a are seated in the bores of inlet spigots 49, 49a. The inlet check valves 30, 30a, when unseated, provide communication between the main additive lines 46, 46a and piston chambers 44, 44a, respectively.

The additive is drawn up in alternate fashion into piston chambers 44, 44a, through inlet check valves 48, 48a, and then alternately discharged via outlet check valves 52, 52a and outlet lines 54, 54a, into the main chambers 26, 24, as will be more fully described in the operation of the pump 10.

The piston housings 47, 47a, are provided with, externally threaded, headed retainers 82, 82a, threadably mounted in access openings 83, 83a, in piston housings 47, 47a. The openings 83, 83a are provided directly above additive check valves 48, 52 and 48a, 52a, respectively, as viewed in FIG. 4, and enable easy assembly of the check valves 52, 52a to be made in piston housings 47, 47a.

O-rings 50, 50b are provided in piston housing 47, 47a for fluid tightness with main housing 20b, 20a, respectively. Similarly, O-rings are appropriately provided, at the ends of piston 42, around the retainers 83, 82a, and around inlet spigots 49, 49a, for fluid tightness.

The details of the operation of the proportioning pump 10 will now be described.

In starting the pumping action, the priming valve 21 is first opened to the atmosphere. The priming valve 21 comprises a bleed plug 41, threadably mounted to flange 40 of housing 20b, and includes a bleed valve 59 threadably mounted within bleed plug 41. Bleed valve 59 has an internal bore therein (not shown) which will be vented through openings 41a, 41b in plug 41 when bleed valve 59 is unscrewed a small distance. The opening of bleed valve 59 of priming valve 21 merely allows air within the main fluid chambers 24, 26 to be bled off or exhausted.

The main fluid inlet shut-off valve 18 is next opened, thus allowing a portion of the water from main line 12 to be diverted through main pump inlet line 14, through inlet orifice 24a and into chamber 24. Water also passes through by-pass line 23, into orifice 26a, and thence into chamber 26. Water thus enters both chambers 24 and 26. Outlet line 16 is not yet opened so that water will flow through chambers 24, 26 and through vents 41a, 41b of priming valve 21, thus purging the housing 20 of air.

It is important to note that, though the diaphragm assembly 34 and main fluid chambers 24 and 26 are produced to a precise manufacturing tolerance, the slightest irregularities in production cause a slight difference in volume, from one main chamber to another. This difference between the fluid chambers caused the diaphragm to initially move into one of the fluid chambers, for example, chamber 26, thus commencing the cyclic pumping operation, even during priming.

As the diaphragm 22 moves to decrease the volume of chamber 26 water will be discharged therefrom through priming valve 21, and the valve sealing means 31 will move to close off chamber 26 by seating relief valve 26c on outlet port 26b. Thus, water is forced from fluid chamber 26 due to the instantaneous pressure differential between the chambers 24 and 26, with chamber 24 being at the higher pressure. The movement of the diaphragm 22, which causes relief valve 26c to seat on port 26b, also causes piston 42 to slide within piston chambers 44, 44a, thus creating a relative vacuum in piston chamber 44a and a pressure build up in chamber 44. The vacuum thus created draws additive solution from a storage tank (not shown), via an additive valve inlet means 30a, into piston chamber 44a as will be more fully described hereafter.

Upon the closing of outlet port 26b by relief valve 26c, the outlet port 24b is now opened and the pressure in chamber 26 will now exceed that in chamber 24. The diaphragm-piston arrangement therefore reverses direction, due to the reversed pressure differential, and the diaphragm assembly 34 moves to decrease the volume of chamber 24. The reversed piston movement causes additive, drawn up into piston chamber 44a on the previous stroke, to be forced from piston chamber 44a, into main chamber 24, wherein it is ejected with the water in chamber 24, through priming valve 21, via bypass line 39.

This cyclic priming operation continues until the system has been completely purged of air, through priming valve 21, at which time the outlet shut-off valve 19 is opened. Priming valve 21 is then closed by screwing in bleed valve 59 and the pump 10 begins normal operation.

Once the system is primed, operation of the pump continues much as has been just described, with respect to the priming operation, except that the water and additive is pumped through outlet line 16 into the main feed pipe 12. The cyclic pumping operation follows.

A portion of the water from the main feed line 12 is continually fed to main pump inlet pipe 14 and thence to main pump inlet orifices 24a, 26a (via bypass line 23). The water enters the main fluid chambers 24, 26 of the pump 10 and the diaphragm assembly 34 is exposed to an instantaneous pressure differential between the chambers — that is, the difference between the fluid source, under pressure in one closed chamber, and the relative vacuum created by the pumping of the fluid from the other of the fluid chambers. For example, assume fluid is initially retained in fluid chamber 24 because relief valve 24c has initially seated on outlet port 24b, thus closing the fluid path from port 24b to outlet pipe 16. In accomplishing this, the valve sealing means 31 urges relief valve 24c to remain seated on port 24b because of the compression in spring 27a.

Almost simultaneously with relief valve 24c being seated, relief valve 26c is unseated (cracked) from port 26b by the urging of spring 27, which was flexed in tension, just prior to cracking the relief valve 26c. It is this tension of spring 27 which enables the relief valve 26c to readily unseat, just as it is the compression in spring 27a, transmitted through valve stem 33, which urges the relief valve 24b to be seated.

The relative vacuum created in chamber 26 due to the unseating of relief 26c, causes diaphragm 22, after completing its pumping stroke in chamber 24, to reverse direction and move downwardly, to decrease the volume of chamber 26, as viewed in FIG. 3.

The movement of the diaphragm 22 causes the piston 42 to slide in bores 43a, 43, thus causing a relative vacuum in piston chamber 44a and a pressure build up in piston chamber 44. Due to the creation of vacuum in chamber 44a, additive solution is drawn up into piston chamber 44a, as follows. The additive solution is drawn through additive inlet hose 46a, inlet spigot 49a and check valve 48a. Check valve 48a is unseated during the suction stroke of the piston 42 in piston chamber 44a. The additive thus is drawn through additive inlet port 30a and into piston chamber 44a. While the suction stroke is taking place in piston chamber 44a, a delivery stroke is simultaneously occurring in the other piston chamber 44 due to the pressure build up in this chamber. This delivery stroke ejects the contents of piston chamber 44 through outlet check valve 52, and into chamber 26, via additive outlet line 54. The check valve 52 is unseated to allow passage of the additive. (Outlet check valve 52 seats in additive outlet line 54, by gravity, and is readily unseated, under the influence of the pressure build-up in piston chamber 44, to allow ejection of the additive, from the piston chamber 44, into main chamber 26. Inlet check valve 48 remains seated during the pressure build-up in piston chamber 44.)

As additive is ejected into chamber 26, the contents of chamber 26, i.e., water plus additive are ejected, into outlet line 16, via outlet port 26b and line 39 until relief valve 26c is seated to close off chamber 26.

The additive stored in piston chamber 44a remains there until the diaphragm assembly 34 reverses direction and piston 42 ejects the contents of piston chamber 44a, in a delivery stroke, through outlet check valve 52a, into chamber 24, via additive outlet line 54a.

Relief valve 26c is aided in being seated onto port 26b, and closes off port 26b, by the compression of spring 27, together with the flexion of spring 27a. Thus, as diaphragm assembly 34 moves into chamber 26, thereby decreasing its volume, the tension in spring 27a builds up and spring 27a cracks open valve 24c and then urges valve 26c to seat onto and close off, port 26b by the compression in spring 27.

All the check valves 48, 48a, 52, 52a are preferably made of Buna-N rubber and are all seated, by gravity, in their respective additive inlet and additive outlet lines.

Chamber 26 is thus closed off after having its contents discharged through outlet line 16 via bypass 39. Shortly after relief valve 26c is seated (and relief valve 24c simultaneously unseated) main fluid chamber 26 will be at the higher pressure causing diaphragm assembly 34 to move back toward main fluid chamber 24. This movement of the diaphragm assembly 34 causes piston 42 to slide in its housing creating a vacuum in piston chamber 44. This vacuum draws additive into piston chamber 44 via a sequence of inlets, ports and check valves 46, 49, 30, 48 and 52 (located in a piston housing 47) identical to that sequence of inlets, ports and check valves 46a, 49a, 30a, 48a, and 52a previously described with respect to piston chamber 44a. The contents of chamber 44a are later ejected as previously described.

Check valve 52a is unseated as diaphragm assembly 34 moves toward chamber 24, by the pressure caused by the pumping action of the piston 42 on the additive solution in piston chamber 44a. Thus, the additive in chamber 44a is pumped through additive outlet line 54a into chamber 24. The additive and water mix within the chamber 24 and the resulting solution is then discharged, by the pumping action of the diaphragm, via port 24b, through outlet line 16. During this pumping action, valve 48a is seated, by gravity, on port 30a, thus preventing additive from being drawn up from the storage tank or conversely, preventing the fluid from being discharged back to the storage tank.

This completes the cyclic motion of the pump whereby the additive is drawn up, alternatively, into each of the fluid chambers 24, 26, and then alternately discharged via ports 24b, 26b, respectively, into outlet line 16 and thence to the main water line 12.

The invention preferably uses a large area ratio of outlet 24b to inlet 24a, e.g., between about 50:1 and 250:1 and presently 150:1, so that, for a given piston size, the additive is well diluted. This dilution results in a solution which can be relatively non-corrosive and non-toxic, even if a human being or animal drinks the water discharged from the line.

For a given piston size, the amount of additive drawn into the chambers 24, 26, depends upon the volume of flow of water into their respective inlet orifices 24a, 26a.

This invention also enables the interchangeability of the piston housing units 47, 47a, in order to readily change the ratio of fertilizer to water. The interchangeable housing units 47, 47a, will contain different diameter of bores 43, 43a, which, together with a conformingly sized piston 42 changes the volume of the piston chambers 44, 44a. The piston chamber sizes are readily varied to pump from one-quarter g.p.m. to three quarter g.p.m. of fertilizer solution assuming the pump is operating between about 18-36 cycles per minute.

In addition, each of the additive piston housing units 47, 47a, may have the same or different pumping capability. One piston housing, for example, 47, with a capability of pumping one-quarter g.p.m. could be connected to housing 20b, and the other piston housing unit 47a, with a capability of pumping three-quarter g.p.m., could be connected to housing 20a.

In addition, the pump user need not connect both inlet additive pipes 46a, 46, at the same time. The pump 10 operates efficiently, also, by connecting only one inlet additive pipe and thereby pumping the additive plus water solution from only one side of the main housing 20. If this were to be done, the corresponding check valve 52 or 52a, of the disconnected piston housing may be removed from the piston housing. This allows water, rather than air, to circulate around piston 42 thereby preventing excessive wear of the piston and piston chamber.

DESCRIPTION OF THE ALTERNATIVE EMBODIMENT

FIG. 5 shows a modified form of the proportioning pump 100. In this alternate configuration, the pump housing 20 is provided with a spring-loaded valve sealing means 131 for alternatively opening and closing inlet ports 60a, 60b, i.e., the valve sealing means 131 is now mounted on the diaphragm 22 so as to open and close the main fluid inlet ports 60a, 60b, rather than the outlet ports, as in the preferred embodiment. This modification requires that the relief valves 64a, 64b of sealing means 131 be situated on the outside of the main fluid chambers 124, 126. In comparison to the preferred embodiment the outlet ports 62a, 62b would always remain open.

The alternative embodiment would operate in the following manner.

The priming of the pump 100 would take place in substantially the same way, as with the preferred embodiment. That is, the priming valve assembly 141 would first be opened to the atmosphere. Water enters from main line 66b and into chambers 124, 126 thereby initiating the movement of the diaphragm assembly 134 because of the pressure differentials initially set up. The outlet line 116 is closed off and the air purged through bleed valve 121 and vents 141a, 141b. After the system has been primed, operation of the pump continues with a portion of the water from the main feed line 12 being diverted through main fluid inlet pipe 66b and then to chambers 124, 126, respectively.

Thus, assume that valve sealing means 131 is initially in the FIG. 5 position, the inlet to main chamber 126 is closed and the inlet to main chamber 124 is open. The pressure in chamber 124 will be greater than in chamber 126, causing diaphragm assembly 134 to move upwardly, (as shown in FIG. 5) thereby causing relief valve 64a to seat on inlet port 60a (to close chamber 124) and simultaneously causing relief valve 64b to open inlet port 60b (opening chamber 126). As diaphragm assembly 134 moves upwardly, the piston 142 creates a suction stroke in piston chamber 144 and a delivery stroke in piston chamber 144a, the delivery stroke bringing additive from piston chamber 144a into main chamber 126. The suction stroke bring additive into piston chamber 144, as described with reference to the embodiment of FIGS. 1-4.

The contents of main chamber 126 are dispensed, into outlet line 116, through outlet orifice 62a, as relief valve 64a is being seated onto inlet port 60a. The spring loading 127, 127a on valve sealing means 131 operates in the same manner as springs 27, 27a in the FIGS. 1–4 embodiment. The reverse piston stroke occurs as main chamber 126 moves from the open inlet position to the closed inlet position.

The overall operation of the cyclic pumping action of pump 100 is substantially the same as that of pump 10 in spite of the re-arrangement of parts.

I claim:

1. A hydraulically actuated volumetric proportioning pump, for injecting one liquid into another liquid, comprising:

a main housing;

a diaphragm movably mounted within said main housing and generally centrally located therewithin to form a first main chamber and a second main chamber;

fluid inlet means to each of said first and second main chambers, said fluid inlet means being adapted to be connected to a main fluid source;

first and second outlet ports for said first and second main chambers, respectively;

a main valve means mounted to said diaphragm and movable therewith to alternatively open and close the first and second outlet ports of said first and second main chambers in response to the movement of said diaphragm;

piston housing means mounted to the main housing having bores therein defining a first and second piston chamber means;

a piston means mounted to the diaphragm and movable within said first and second piston chamber means as a result of the movement of said diaphragm;

an additive inlet means, adapted to be connected to a source of additive fluid, communicating with at least one of said piston chamber means;

an additive outlet means, leading from at least one of said piston chambers to at least one of said main chambers;

an additive inlet valve means for said additive inlet means;

an additive outlet valve means for said additive outlet means, whereby as fluid moves into said main chambers from said main fluid source, said diaphragm is moved, under the influence of a pressure differential imposed between said first and second main chambers, towards one side of said main housing, and said main valve means, mounted to said diaphragm, thereby moves to close said first outlet port and open said second outlet port, said piston means, mounted to said diaphragm, moves to decrease the volume of the first piston chamber means and increase the volume of said second piston chamber means thereby creating a suction stroke in said second piston chamber means, drawing additive fluid, through said additive valve inlet means and into said second piston chamber means and also creating a delivery stroke, in said first piston chamber means, to eject any additive stored in said first piston chamber through said additive valve outlet means, and into said first main chamber, which additive is evacuated from said first main chamber with the main fluid during the time that said first outlet port is open, and, as said first outlet port is closed, said outlet port of said second main chamber is opened, thereby imposing a reverse pressure differential which causes said diaphragm to move in a direction which is the reverse of its previous direction, whereby the main valve means moves to close off said second outlet port, the reverse movement of said diaphragm causing said piston means to decrease the volume of said second piston chamber means and increase the volume of said first piston chamber means thereby causing any additive fluid stored in said second piston chamber means to be ejected through said additive valve outlet means, into said second main chamber, which additive is then evacuated through said second outlet port with main fluid, during the time that said second outlet port remains open, and whereby the reverse movement creates a suction stroke in said first piston chamber thereby drawing and storing additive fluid in said first piston chamber.

2. The proportioning pump of claim 1 in which said main valve means, mounted to the diaphragm, for alternatively opening and closing the first and second outlet ports of said first and second main fluid chambers, is spring-loaded.

3. The proportioning pump of claim 1 in which said piston housing means is removably mounted to said main housing.

4. The proportioning pump of claim 1 in which said piston housing means is provided with means for being removably mounted to said main housing, and is provided with sealing means with said main housing for fluid-tightness.

5. The proportioning pump of claim 1 in which said diaphragm comprises a flexible solid membrane centrally located between two metal plates and sealing means on said membrane for effecting a fluid tight fit of said diaphragm within said main housing.

6. The proportioning pump of claim 1 wherein said main valve means includes an elongated valve stem mounted to said diaphragm, a pair of relief valves, each mounted to the ends of said valve stem and coil spring means mounted on said valve stem between said relief valves, whereby said main valve means alternately open and close the outlet ports of each main chamber.

7. The proportioning pump of claim 1 in which means for priming the pump is provided, said priming means including vent means for exposing said main chambers to the atmosphere.

8. The proportioning pump of claim 1 in which said additive inlet valve means comprises an additive inlet spigot having an additive inlet port and adapted to be connected to an additive inlet pipe, and having a gravity seating additive inlet check valve which opens and closes said additive inlet port in response to the pressure within said piston chamber means.

9. The proportioning pump of claim 1 in which said additive outlet means comprises a gravity seating additive outlet check valve which opens and closes an additive outlet port in response to pressure within said piston chamber means.

10. The proportioning pump of claim 1 in which the area ratio of said first outlet port to said fluid inlet means of said first main chamber, is between about 50:1 and 250:1.

11. The proportioning pump of claim 1 in which said main housing comprises a pair of sub-housings, and means for affixing said sub-housings to each other to form said main housing.

12. The proportioning pump of claim 1 in which said piston housing means comprises a pair of substantially identical housings removably mounted onto said main housing.

* * * * *